Aug. 29, 1967  D. PATTERSON  3,338,119

HOSE CLAMP REMOVAL APPRATUS

Filed May 25, 1966

INVENTOR.
David Patterson
BY
O. A. Steinmiller
Attorney

United States Patent Office 3,338,119
Patented Aug. 29, 1967

3,338,119
HOSE CLAMP REMOVAL APPARATUS
David Patterson, East McKeesport, Pa., assignor to Westinghouse Air Brake Company, Wilmerding, Pa., a corporation of Pennsylvania
Filed May 25, 1966, Ser. No. 552,964
8 Claims. (Cl. 81—9.3)

This invention relates to a hose clamp removal apparatus, and more particularly to a novel hose clamp removal apparatus which may be added to form a part of a hose clamp applying machine, to effect the removal of a hose clamp.

There is disclosed in Reissue Patent 24,636, issued April 21, 1959 to Ellis E. Hewitt et al., a fluid pressure operated hose clamp applying machine for applying a hose clamp of the character disclosed in United States Letters Patent No. 2,312,575 issued March 2, 1943 to C. H. McKee, and assigned to Punch-Lok Company, Chicago, Illinois. The fluid pressure operated hose clamp applying machine disclosed in Reissue Patent 24,636 is operative to tighten, lock and subsequently remove excess strap material requisite to the application of the hose clamp of the aforesaid McKee patent to a section of rubber hose for securing the hose to a nipple, coupling head or the like.

A separate hose clamp removal machine has up to the present time been provided for removing the hose clamp. Space requirements of providing separate hose clamp applying and hose clamp removal apparatus make it desirable to provide one device capable of both applying and removing hose clamps.

Accordingly, it is the general purpose of this invention to provide a novel hose clamp removal apparatus applicable to a standard type hose clamp applying machine of the type disclosed in Reissue Patent 24,636, whereby the one machine may be used for both applying and subsequently removing a hose clamp. A saving of space and a substantial reduction in the overall cost of the equipment required for the application and removal of hose clamps and hose to and from nipples, coupling heads and the like is thus accomplished.

More particularly, according to the present invention, the novel hose clamp removal apparatus replaces the hose clamping body cover presently used with the hose clamp applying machine of the type disclosed in Reissue Patent 24,636 and includes a rectangular slotted plate that is secured to the hose clamp applying machine, in place of the body cover, to which plate a first hose clamp cutter is fixedly secured adjacent one end of an elongated slot therein, and a second or movable hose clamp cutter. The movable hose clamp cutter is slidably mounted in the elongated slot and is movable toward the first cutter by a rockable lever to thereby shear off a hose clamp placed between the cutters. The inner end of the lever is operatively engaged and moved by a piston and piston rod of the hose clamp applying machine to effect movement of the second hose clamp cutter toward the fixed clamp cutter and is restored by a biasing means, such as a spring.

DESCRIPTION

Figure 2:
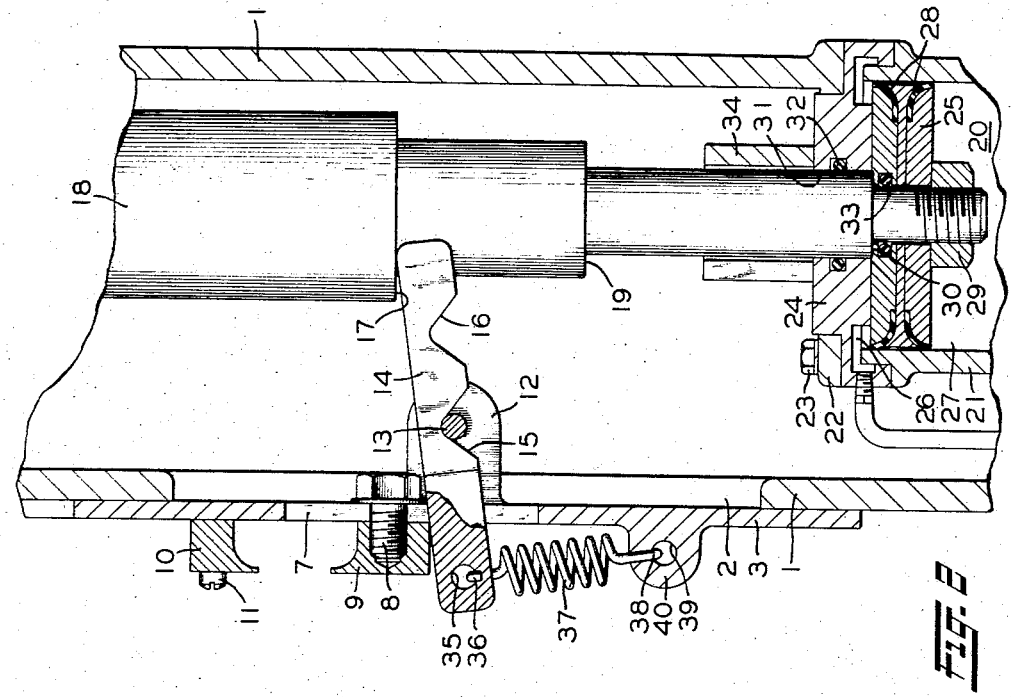
FIG. 2 is a cross-sectional view of the hose clamp removal apparatus and the hose clamp applying machine taken along the line 2—2 in FIG. 1 and looking in the direction of the arrows, showing further structural details of the hose clamping removal apparatus and how it is actuated by the hose clamp applying machine.
Figure 1:
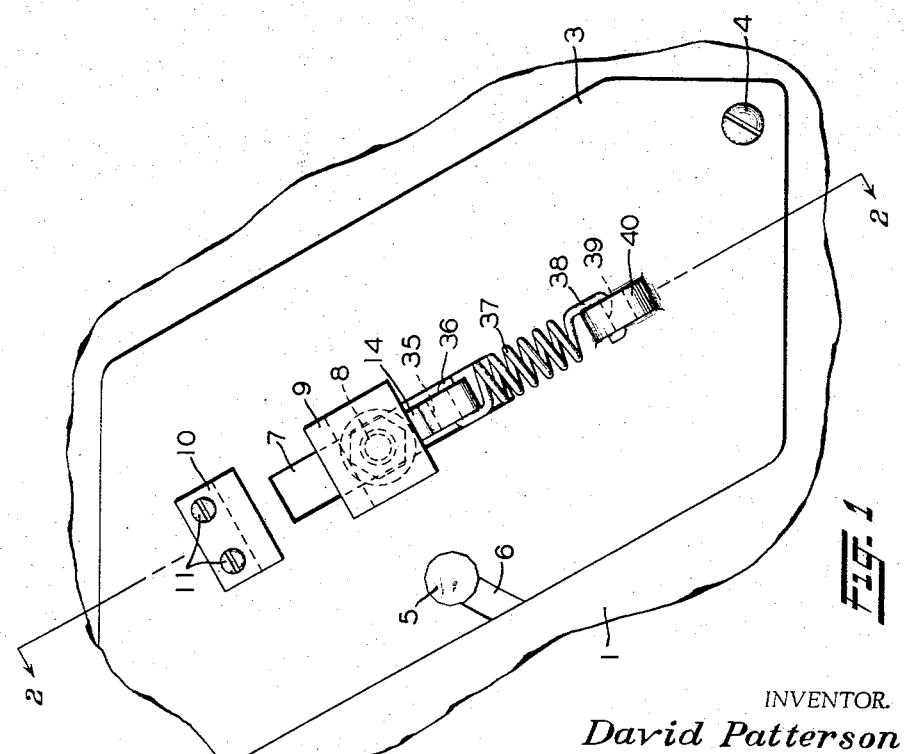
FIG. 1 is a front elevational view of a hose clamp removal apparatus that is applicable as an accessory to a hose clamp applying machine for operation thereby.

In FIG. 1 of the drawing there is shown a portion of the body of a fluid pressure operated hose clamp applying machine such as that disclosed in Reissue Patent 24,636 issued April 21, 1959 to Ellis E. Hewitt et al., which portion is indicated by the numeral 1. This body portion 1 is provided with an opening 2 which is shown in FIG. 2 of the drawing. This opening in the body of the hose clamp applying machine disclosed in the abovementioned reissue patent is closed by a hose clamping body cover which in the present invention is replaced by a substantially rectangular plate 3. As shown in FIG. 1, the plate 3 is secured to the body portion 1 by a machine screw 4 that extends through a smooth bore in the plate 3 and has screw-engagement with a coaxial screw-threaded bottom bore formed in the body portion 1, and by a thumb screw 5 that passes through an arcuate slot 6 formed in the left-hand side of the plate 3 and has screw-threaded engagement with a second screw-threaded bottom bore formed in the body portion 1.

The plate 1, substantially midway its width, is provided with an elongated slot 7 through which, as shown in FIG. 2, extends a cap screw 8 that has screw-threaded engagement with a movable hose clamp cutter 9 it being understood that the width of the slot 7 and the diameter of the cap screw 8 are such as to provide for a sliding fit of the cap screw within the slot. As shown in FIG. 1, a stationary hose clamp cutter 10 is removably secured to the plate 3 by a pair of cap screws 11.

As viewed in FIG. 2 of the drawing, the right-hand side of the plate 3 has formed integral therewith a clevis 12, only one jaw of which appears in FIG. 2, these jaws being located on the respective opposite sides of the slot 7. Anchored in the jaws of the clevis 12 are the opposite ends of a fulcrum pin 13 for supporting an operating lever 14 the left-hand end of which extends through the slot 7 so as to support thereon the movable hose clamp cutter 9. The lever 14 has formed on its lower side two spaced-apart substantially V-shaped grooves 15 and 16 in either of which may be received the fulcrum pin 13 so that the lever 14 is rockable thereabout in a manner hereinafter described.

While the fulcrum pin 13 is disposed in the groove 15, as shown in FIG. 2 of the drawing, the right-hand end of the lever 14 lies in the path of movement of a first shoulder 17 formed on a piston rod 18 which, as shown in the drawing, is provided with a second shoulder 19 located below the first shoulder 17.

The piston rod 18 constitutes a part of a pull cylinder device 20 of the hose clamp applying machine disclosed in the above-mentioned Reissue Patent 24,636. This pull cylinder device 20 comprises a hollow casing 21 removably attached to a flange 22 formed integral with the body portion 1 by means such as, for example, a plurality of cap screws 23 only one of which appears in FIG. 2 of the drawing. One end of the casing 21 is closed by a pressure head 24 which is clamped between the flange 22 and the casing 21 by action of the cap screws 23. A pull piston 25, slidably disposed in the hollow casing 21, is subject opposingly to pressure of fluid in a pair of chambers 26 and 27 formed on the respective opposite sides of the piston. Two oppositely arranged packing cups 28 are provided on the pull piston 25 to prevent leakage of fluid under pressure between the pressure chambers 26 and 27 in either direction past the piston. The piston 25 is removably attached to the lower end of the above-mentioned piston rod 18 by means of a nut 29 that has screw-threaded engagement with external screw threads formed on the lower end of the piston rod 18 below a third shoulder 30 formed on this piston rod below the above-mentioned second shoulder 19. That portion of the piston rod 18 extending between the shoulders 19 and 30 thereon is slidably and guidably supported within a central opening or bore 31 extending through the pressure head 24. An O-ring 32 is disposed in an internal annular groove formed in the wall of the bore 31 in the pressure head 24 and encircles that portion of the piston rod 18 extending between the shoulders 19 and 30 thereon to form a sliding seal therewith to prevent leakage of fluid under pressure from the chamber 26. A second O-ring 33 carried in an internal annular groove formed in the pull piston 25 encircles the lower end of the piston rod 18 below the shoulder 30 thereon to form a seal therewith to prevent leakage of fluid under pressure between the chambers 26 and 27 along this portion of the piston rod.

In order to limit clockwise rocking of the lever 14 in response to downward movement of the piston 25 and piston rod 18, and therefore, the upward travel of the movable hose clamp cutter 9 toward the stationary cutter 10, a stop 34 in the form of a semi-circular sleeve may be removably placed on top of the pressure head 24 and in surrounding relation to that portion of the piston rod 18 extending below the shoulder 19 thereon and the top of the pressure head 24.

As shown in FIG. 2 of the drawing, the lever 14, adjacent its left-hand end is provided with a bore 35 in which is received a hook 36 formed at one end of a tension spring 37 the opposite end of which is provided with a second hook 38 that is received in a bore 39 provided in a boss 40 that is formed integral with the plate 3 on the left-hand side thereof as viewed in FIG. 2 of the drawing. While the fulcrum pin 13 is disposed in the groove 15 in the lever 14, the tension spring 37 serves to bias the right-hand end of the lever 14 against the shoulder 17 formed on the piston rod 18.

It should be noted that the hose clamp removal apparatus constituting the present invention may be rendered inoperative by downward movement of the piston rod 18 of the pull cylinder device 20 by manually lifting upward on the left-hand end of the lever 14 until the fulcrum pin 13 is no longer disposed in the groove 15, and thereafter exerting a pull on the lever 14 in the direction of the left-hand until the left-hand side of the groove 16 therein is in alignment with the fulcrum pin 13 and the right-hand end of the lever 14 is disposed out of the path of movement of the shoulder 17 on the piston rod 18. The manual lifting force may now be gradually released from the left-hand end of the lever 14 whereupon the tension spring 37 is rendered effective to pull the lever 14 downward and in the direction of the left-hand so that the left-hand side of the inverted V-shaped groove 16 slides along the fulcrum pin 13 until this pin reaches the top of the inverted V-shaped groove 16. The fluid pressure operated hose clamp applying machine may now be operated in the manner described in hereinbefore-mentioned Reissue Patent 24,636 without effecting rocking of the lever 14.

OPERATION

To effect operation of the hose clamp removal apparatus constituting the present invention by the fluid pressure operated hose clamp applying machine described in Reissue Patent 24,636, first, the hose clamp applying machine is operated in the manner described in detail in this reissue patent to cause the piston 25 and its piston rod 18 to be moved to the position shown in FIG. 2 of the drawing.

Next, the lever 14 is manually placed in the position shown in FIG. 2 in which the fulcrum pin 13 is disposed in the groove 15 in this lever. While the fulcrum pin 13 is disposed in the groove 15, the spring 37 is effective to bias the right-hand end of the lever 14 against the shoulder 17 on the piston rod 18.

After the lever 14 has been positioned as shown in FIG. 2, the semi-circular stop 34 is placed on top of the pressure head 24 and in surrounding relation to that portion of the piston rod 18 extending between the shoulder 19 thereon and the top of the pressure head 24 to limit the downward movement of the piston 25 and its piston rod 18 to a distance equal to the distance from the shoulder 19 on the piston rod 18 to the top of the stop 34.

Following placing the stop 34 on top of the pressure head 24, the metal keeper strap of a hose clamp that secures a piece of hose to, such as a nipple, or a hose coupling, which keeper strap is identified in the above-mentioned Reissue Patent 24,636 by the reference numeral 4, is so placed that its opposite parallel sides are disposed between the cutting edges of the movable hose clamp cutter 9 and the stationary hose clamp cutter 10 shown in FIG. 2 of the drawing.

Now while the piece of hose and the keeper strap securing it to such as the nipple or hose coupling are held in any suitable manner in the position described above, the hose clamp applying machine will be operated in the manner described in Reissue Patent 24,636 to effect the supply of fluid under pressure to the chamber 26 it being understood that at this time the chamber 27 at the opposite side of the piston 25 is charged with fluid under pressure in the manner described in Reissue Patent 24,636 at a pressure less than the pressure of the fluid supplied to the chamber 26. The fluid in the chamber 26 at a pressure in excess of that in the chamber 27 will therefore cause the piston 25 and piston rod 18 to move downwardly from the position shown in FIG. 2.

As the piston rod 18 is thus moved downwardly from the position shown in FIG. 2, it is effective via the shoulder 17 thereon to rock the lever 14 clockwise about the fulcrum pin 13 against the yielding resistance of the spring 37. It may be seen from FIG. 2 that this clockwise rocking about the pin 13 is effective to move the movable hose clamp cutter 9 upward toward the stationary hose clamp cutter 10, it being understood that the cap screw 8 is simultaneously moved upward in the slot 7 to thereby guide the cutter 9 in its movement toward the stationary cutter 10.

Since the opposite parallel sides of the keeper strap are disposed between the cutting edges of the cutters 9 and 10, as hereinbefore described, it will be apparent that this movement of the movable cutter 9 toward the stationary cutter 10 is effective to shear off or break the keeper strap away from the peripheral surface of the hose about which the hose clamp is disposed.

When the keeper strap is sheared off or broken in the manner just described, the hose clamp can be removed from the hose after which the hose can be manually removed from the nipple, coupling head or the like.

Subsequent to the shearing off of the keeper strap and removal of the hose from the nipple, coupling head or the like, the hose clamp applying machine may be operated in the manner described in Reissue Patent 24,636 to cause the piston 25 and the piston rod 18 to be moved upward to the position shown in FIG. 2 of the drawing. As the piston 25 and piston rod 18 are thus moved upward, the spring 37 is rendered effective to rock the lever 14 counterclockwise about the fulcrum pin 13 to maintain the right-hand end of the lever 14 in abutting contact with the shoulder 17 on the piston rod 18. Furthermore, as the lever 14 is thus rocked counterclockwise about the fulcrum pin 13, the movable hose clamp cutter 9 will be moved downward by its own weight so that its bottom right-hand edge remains at all times in contact with the upper side of the lever 14. It will be understood that as the movable hose clamp cutter 9 is thus moved downward by its own weight it is guided by the cap screw 8 which extends through the slot 7 and has screw-threaded engagement with the cutter 9 since the distance between two parallel sides of the head of the cap screw 8 is greater than the width of the slot 7.

The hose clamp on another piece of hose may now be removed by repeating the operation described above.

When it is desired to again use the hose clamp applying machine to apply hose clamps to hose, the stop 34 will be removed from the top of the pressure head 24 and in surrounding relation to the piston rod 18. Also, the lever 14 will be moved to the position in which the fulcrum pin 13 is disposed in the groove 16.

Having now described the invention, what I claim as new and desire to secure by Letters Patent is:

1. An improvement for a fluid pressure operated hose clamping machine having at least one fluid pressure operated piston, the piston rod of which is provided with a shoulder thereon, said improvement constituting a hose clamp removal apparatus comprising, in combination:
   (a) a stationary hose clamp cutter carried by the hose clamping machine,
   (b) a hose clamp cutter slidably mounted for movement toward and away from said stationary hose clamp cutter, and
   (c) an operating lever pivotally mounted on the hose clamping machine so as to have one end thereof disposed in the path of movement of the shoulder on the piston rod of the at least one fluid pressure operated piston of the hose clamping machine and the other end in operating relation to said movable hose clamp cutter whereby movement of the piston rod in one direction effects movement of said movable hose clamp cutter toward said stationary hose clamp cutter whereby said movement of said movable hose clamp cutter is effective to shear off a keeper strap disposed between said cutters and locking a hose clamp that secures a hose to a cylindrical member.

2. The improvement for a hose clamping machine claimed in claim 1, further characterized by a detachable stop means for limiting the movement of the piston rod of the at least one fluid pressure operated piston thereby to correspondingly limit the rocking of said lever and movement of said movable hose clamp cutter in said opposite direction.

3. A conversion kit for a fluid pressure operated hose clamping machine which has a removable door, said kit comprising:
   (a) a substantially flat member substitutable for the removable door of the hose clamping machine, said member having an elongated slot formed therein,
   (b) a fixed hose clamp cutter secured to said member adjacent one end of said slot,
   (c) a hose clamp cutter slidably mounted on said flat member for movement toward and away from said fixed hose clamp cutter in alignment therewith,
   (d) a fulcrum member carried by said flat member, and
   (e) a removable lever selectively rockable in either one of two positions on said fulcrum member whereby, when in one of said two positions, operation of the fluid pressure operated hose clamping machine causes rocking of said lever in a direction to effect movement of said movable hose clamp cutter toward said fixed hose clamp cutter to shear off a keeper strap locking a hose clamp and disposed between said cutters and when in the other of said two positions, said lever is rendered inoperative by operation of the fluid pressure operated hose clamping machine.

4. A conversion kit for a fluid pressure operated hose clamping machine, as claimed in claim 3, further characterized by guide means including a cylindrical member the diameter of which is substantially the width of said slot, and in that said cylindrical member is provided at one end with a head the diameter of which is in excess of the width of said slot and at the opposite end with means for securing said cylindrical member to said movable hose clamp cutter.

5. A conversion kit for a fluid pressure operated hose clamping machine, as claimed in claim 3, further characterized in that said removable lever is provided with two spaced-apart grooves in one or the other of which is disposed said fulcrum member accordingly as said lever is disposed in one or the other of its said two positions.

6. A conversion kit for a fluid pressure operated hose clamping machine, as claimed in claim 3, further characterized in that said flat member is provided with a smooth bore and with an arcuate slot the center of curvature of which coincides with the center of said bore, and in that said conversion kit further includes a cap screw for insertion through said bore to rockably mount said flat member about said cap screw and a thumb nut for insertion through said arcuate slot to, when tightened, secure said flat member against the hose clamping machine and, when loosened, enable rocking said flat member about said cap screw relative to the hose clamping machine.

7. A conversion kit for a fluid pressure operated hose clamping machine, as claimed in claim 3, further characterized in that said kit includes means for biasing said lever in one direction about said fulcrum member.

8. A conversion kit for a fluid pressure operated hose clamping machine, as claimed in claim 3, further characterized in that said kit includes a stop device for limiting the degree of rocking of the said lever and the consequent movement of said movable hose clamp cutter toward said fixed hose clamp cutter.

References Cited

UNITED STATES PATENTS

| Re. 24,636 | 4/1959 | Hewitt et al. | 81—9.3 |
|---|---|---|---|
| 858,271 | 6/1907 | Faessler | 30—180 |
| 2,837,949 | 6/1958 | Lodholm | 81—9.3 |
| 3,027,788 | 4/1962 | Ott et al. | 81—9.3 |

WILLIAM FELDMAN, *Primary Examiner.*

M. S. MEHR, *Examiner.*